Sept. 17, 1929.    V. BENDIX    1,728,172

METHOD OF MAKING BRAKE SHOES

Filed Jan. 19, 1928

INVENTOR
VINCENT BENDIX.
BY
ATTORNEY

Patented Sept. 17, 1929

1,728,172

UNITED STATES PATENT OFFICE

VINCENT BENDIX, OF CHICAGO, ILLINOIS, ASSIGNOR TO BENDIX BRAKE COMPANY, OF CHICAGO, ILLINOIS, A CORPORATION OF ILLINOIS

METHOD OF MAKING BRAKE SHOES

Application filed January 19, 1928. Serial No. 247,799.

This application relates to brake shoes, and is illustrated as carried out in the manufacture of a shoe for an internal expanding automobile brake.

An object of the invention is to provide a shoe and lining having a friction surface adapted for immediate efficient operation, and which does not require "wearing in" for a period of several hundred miles before reaching full effectiveness.

Brake linings are usually woven, ordinarily from asbestos, or asbestos and wire, yarn into a multi-ply fabric, which is then impregnated with a composition having usually an asphaltum base and which gives the desired high coefficient of friction to the fabric, and which preferably also renders the fabric substantially waterproof. It is impossible to form these linings with a truly uniform thickness, a variation of .020 inch or even more being considered commercially good, and a limit or tolerance of .010 inch being considered very close.

Moreover the uneven woven surface accentuates the difficulty of fitting a brake lining accurately to its drum. There are thus numerous high spots which must be "worn in" over a period of several hundred miles before the brake becomes really efficient, and during this "wearing-in" process frequent adjustment is necessary. It should also be noted that it is only after this "wearing-in" process that the lining has a surface which is uniformly impregnated with the friction composition so that it has a uniform coefficient of friction throughout its entire extent.

According to an important feature of my invention, I eliminate this "wearing-in" process, by grinding the friction surface of the lining, after it is attached to the shoe, to form a smooth friction surface having a substantially uniform coefficient of friction throughout its entire extent, so that the shoe will give high and uniform braking efficiency immediately upon its installation.

I also, according to another and very important feature of the invention, take advantage of the grinding or forming of the friction surface of the shoe to permit very large tolerances in the manufacture of the shoe and of the lining. It is desirable that the finished shoe should be as accurate as possible, since adjustments of its anchorage are very undesirable, yet the sum of the tolerances which are essential in the dimensions of the various parts of the shoe, even with a very low tolerance in the thickness of the lining, amounts in cumulative effect to a very considerable inaccuracy.

According to my invention, the shoe is completed with very large tolerances at each step, and .020 inch or even more is allowed as tolerance for the lining thickness, giving a shoe immediately after the attachment of the lining which, according to earlier practices, would probably have been rejected as unusable. I now proceed to grind the lining accurately with a truly-cylindrical surface having its center of curvature in an accurately-determined relation to the pivot or anchor bearing, or some equivalent gage surface on the shoe.

All at one operation, this compensates for variations in lining thickness, for variations in the thickness of the metal of the different parts, for "twist" or "wind" of the shoe, and for all the other variations from standard. The grinding can readily be held within limits of .005 inch, and this is the total variation in the shoe. This compares with a tolerance previously necessary of .010 inch for the lining, .012 inch in thickness of the sheet metal from which the shoe is made, etc. According to my invention, the cumulative error in manufacturing the shoe and lining may amount to .050 or .060 inch, and yet the error in the finished shoe will not be greater than .005 inch.

The above and other objects and features of the invention are illustrated diagrammatically in the accompanying drawing, in which.

Figure 1:
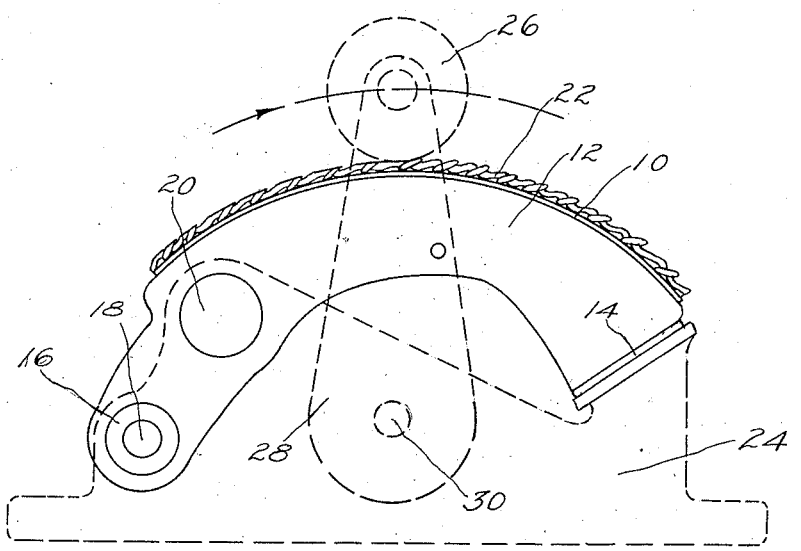
Figure 1 is a side elevation of the completely-assembled shoe during the grinding operation.
Figure 2:
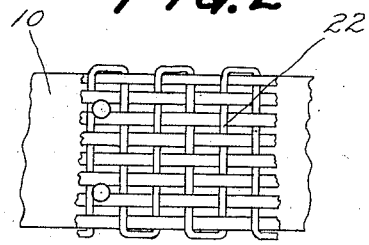
Figure 2 is a partial plan view of the friction face of the shoe before grinding.
Figure 3:
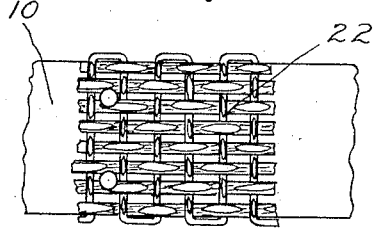
Figure 3 is a similar view after grinding.

The illustrated brake shoe is of the type more fully described and claimed in Patent No. 1,659,368 granted Bendix Brake Company on February 14, 1928, on application No. 173,819, filed March 9, 1927, by Leland E. Long.

This particular shoe includes an outer cylindrical rim or band 10, formed from sheet steel, to the inner face of which is welded a separately-formed stiffening web 12, also stamped from sheet steel, thus forming a unitary shoe body which is T-shaped in cross section. A cam thrust plate 14 may be secured in any desired manner to one end of the shoe, while at the other end washers 16 may be projection-welded to opposite sides of web 12 to form a three-ply structure in which is formed an anchor pivot bearing or opening 18 which is reamed out to a considerable degree of accuracy. There is also an opening 20 in this particular shoe, to provide clearance for the anchor of an adjacent shoe in the assembled brake.

The above-described shoe cannot easily be made entirely accurate, on account of tolerances (or permissible variations) in the width of web 12, in the thickness of rim 10, in the finishing of the anchor pivot bearing 18, etc. To the shoe there is now riveted or otherwise secured a piece 22 of brake lining, preferably an impregnated woven fabric, which must have an additional tolerance of about .020 inch as to thickness, and which also has an uneven surface due partly to its woven structure. Thus the completely assembled shoe, when made with the wide tolerances which are desirable in manufacture is not accurate enough for use in an accurately-made brake, at least without a long preliminary period of wearing in.

According to my invention, therefore, I mount the assembled shoe in a suitable fixture 24, which in the illustrated arrangement positions the shoe by engagement with the cam plate 14 and by means of a pin or projection fitting into the anchor pivot bearing 18, while the friction surface of the lining 22 is accurately ground by a suitable grinding wheel indicated diagrammatically at 26, until it has a cylindrical smooth surface with its center of curvature accurately determined with respect to the anchor pivot bearing 18, or an equivalent gage surface on the shoe. The grinding wheel 26 is shown as swung by a frame 28 about a pivot 30 having its axis in the same position as the center of the brake drum will be in the assembled brake, although of course the grinding wheel may be mounted in a fixed support and the fixture moved instead if preferred.

The woven structure of the lining is purposely exaggerated in the drawing, to illustrate the grinding more clearly. The article of manufacture, namely a brake shoe having a truly cylindrical friction face, which face has a uniform co-efficient of friction, said shoe resulting from my novel process heretofore described, is described in more detail and claimed in my co-pending application No. 383,864, filed August 6, 1929, the same constituting a division of this case.

While a particular construction has been described in detail, it is not my intention to limit the scope of the invention to any particular shoe or other friction element, or otherwise than by the terms of the appended claims.

I claim:

1. That method of manufacturing a brake shoe which comprises (1) assembling and completing the shoe without lining with relatively large tolerances, (2) then attaching a lining having a variable thickness, and (3) then forming the surface of the shoe lining to compensate for inaccuracies due to the cumulative effect of said large tolerances of the shoe and in the lining thickness by forming the surface of the lining to a substantially accurately cylindrical arc having its center of curvature in accurately-determined relationship to a gage surface on the shoe.

2. That method of manufacturing a brake shoe which comprises (1) assembling and completing the shoe without lining with relatively large tolerances, (2) then attaching a lining having a variable thickness, (3) then forming a gage surface on the shoe, and (4) then forming the surface of the shoe lining to compensate for inaccuracies due to the cumulative effect of said large tolerances of the shoe and in the lining thickness by forming the surface of the lining to a substantially accurately cylindrical arc having its center of curvature in accurately-determined relationship to a gage surface on the shoe.

3. That method of manufacturing a brake shoe which comprises (1) assembling and completing a shoe with an anchor pivot bearing without lining, and with relatively large tolerances, (2) then attaching a lining having a variable thickness, and (3) finally forming the surface of the shoe lining, to compensate for all the inaccuracies due to the cumulative effect of said large tolerances of the shoe and in the lining thickness, by forming the surface of said lining to a substantially accurate curve having its center in accurately-determined relationship to said pivot bearing.

4. That method of manufacturing a brake shoe which comprises (1) assembling and completing a shoe with an anchor pivot bearing without lining, and with relatively large tolerances, (2) then attaching a lining having a variable thickness, and (3) finally grinding the surface of the shoe lining, to compensate for all the inaccuracies due to the cumulative effect of said large tolerances of the shoe and in the lining thickness, by grinding the surface of said lining to a substantially accurate curve having its center in accurately-determined relationship to said pivot bearing.

In testimony whereof, I have hereunto signed my name.

VINCENT BENDIX.